(12) United States Patent
Zhou

(10) Patent No.: US 9,280,384 B2
(45) Date of Patent: Mar. 8, 2016

(54) METHOD, SERVER AND SYSTEM FOR PROCESSING TASK DATA

(71) Applicant: TENCENT TECHNOLOGY (SHENZHEN) COMPANY LIMITED, Shenzhen (CN)

(72) Inventor: Guohui Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 280 days.

(21) Appl. No.: 14/152,147

(22) Filed: Jan. 10, 2014

(65) Prior Publication Data

US 2014/0280507 A1 Sep. 18, 2014

Related U.S. Application Data

(63) Continuation of application No. PCT/CN2013/087451, filed on Nov. 19, 2013.

(30) Foreign Application Priority Data

Mar. 18, 2013 (CN) .......................... 2013 1 0086048

(51) Int. Cl.
*G06F 15/16* (2006.01)
*G06F 9/48* (2006.01)
*H04L 29/08* (2006.01)

(52) U.S. Cl.
CPC .............. *G06F 9/4843* (2013.01); *H04L 67/00* (2013.01)

(58) Field of Classification Search
USPC .................. 709/203, 217, 219, 223, 224, 225; 706/61; 705/16; 702/182; 717/101
See application file for complete search history.

(56) References Cited

U.S. PATENT DOCUMENTS

| 8,639,650 | B1* | 1/2014 | Gill | .......................... | G06N 5/04 |
|---|---|---|---|---|---|
| | | | | | 706/61 |
| 2006/0294235 | A1* | 12/2006 | Joseph | ................... | G06Q 10/06 |
| | | | | | 709/225 |
| 2007/0255579 | A1* | 11/2007 | Boland | .................. | G06Q 10/10 |
| | | | | | 702/182 |

(Continued)

FOREIGN PATENT DOCUMENTS

| CN | 101317408 A | 12/2008 |
|---|---|---|
| CN | 101635721 A | 1/2010 |
| CN | 1022244918 A | 11/2011 |
| CN | 102790715 A | 11/2012 |

(Continued)

OTHER PUBLICATIONS

The World Intellectual Property Organization (WIPO) International Search Report for PCT/CN2013/087451 Feb. 27, 2014.

(Continued)

*Primary Examiner* — Quang N Nguyen
(74) *Attorney, Agent, or Firm* — Anova Law Group, PLLC

(57) ABSTRACT

Various embodiments provide methods, servers, and systems for processing task data. In an exemplary method, a task-data-processing request sent by a client can be received. The task-data-processing request can contain a type identifier of task data. The type identifier of the task data can include a daily-task-data identifier, a mainline-task-data identifier, a random-task-data identifier, or a combination thereof. The task data corresponding to the type identifier of the task data can be processed to generate processing results, according to the type identifier of the task data and a preset processing scheme corresponding to each type of the task data. The processing results can be returned to the client.

13 Claims, 6 Drawing Sheets

(56) References Cited

U.S. PATENT DOCUMENTS

2008/0028362 A1* 1/2008 Ugai .................. G06Q 10/06
　　　　　　　　　　　　　　　　　　　717/101
2008/0065396 A1* 3/2008 Marshall ............. G06Q 10/10
　　　　　　　　　　　　　　　　　　　705/16

FOREIGN PATENT DOCUMENTS

WO　　2012110079 A1　8/2012

OTHER PUBLICATIONS

The State Intellectual Property Office of the People's Republic of China (SIPO) Office Action 1 for 201310086048.4 Feb. 4, 2015.

* cited by examiner

METHOD, SERVER AND SYSTEM FOR PROCESSING TASK DATA

CROSS-REFERENCES TO RELATED APPLICATIONS

This application is a continuation application of PCT Patent Application No. PCT/CN2013/087451, filed on Nov. 19, 2013, which claims priority to Chinese Patent Application No. 201310086048.4, filed on Mar. 18, 2013, the entire contents of which are incorporated herein by reference.

FIELD OF THE DISCLOSURE

The present disclosure generally relates to Internet technology and, more particularly, relates to methods, servers, and systems for processing task data.

BACKGROUND

When players play online games (or network games), such as online music games (or network music games), a client-server mode is used. That is, a user first logs in a client. Next, the client obtains task data from a server, and then proceeds to accomplish a corresponding task. As a result, experience is accumulated or reward points are obtained.

In existing technology, game tasks are all requested by the client. The server sends the task data to the client in a fixed order. Thus, the task data are monotonous and uninteresting. In addition, the server cannot meet the diverse needs of users, so efficiency of communication with the users is reduced.

BRIEF SUMMARY OF THE DISCLOSURE

One aspect of the present disclosure includes a method for processing task data implemented by a computer system. In an exemplary method, a task-data-processing request sent by a client can be received. The task-data-processing request can contain a type identifier of task data. The type identifier of the task data can include a daily-task-data identifier, a mainline-task-data identifier, a random-task-data identifier, or a combination thereof. The task data corresponding to the type identifier of the task data can be processed to generate processing results, according to the type identifier of the task data and a preset processing scheme corresponding to each type of the task data. The processing results can be returned to the client.

Another aspect of the present disclosure includes a server for processing task data. An exemplary server can include a receiving unit, a processing unit and a sending unit. The receiving unit can be configured to receive a task-data-processing request sent by a client. The task-data-processing request can contain a type identifier of task data. The type identifier of the task data can include a daily-task-data identifier, a mainline-task-data identifier, a random-task-data identifier, or a combination thereof. The processing unit can be configured to process the task data corresponding to the type identifier of the task data to generate processing results, according to the type identifier of the task data received by the receiving unit and a preset processing scheme corresponding to each type of task data. The sending unit can be configured to return the processing results from the processing unit to the client.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Figure 10:
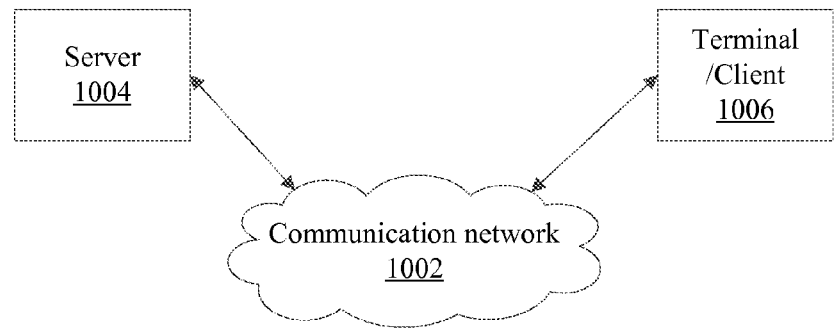
FIG. 10 depicts an exemplary environment incorporating certain disclosed embodiments.
Figure 11:
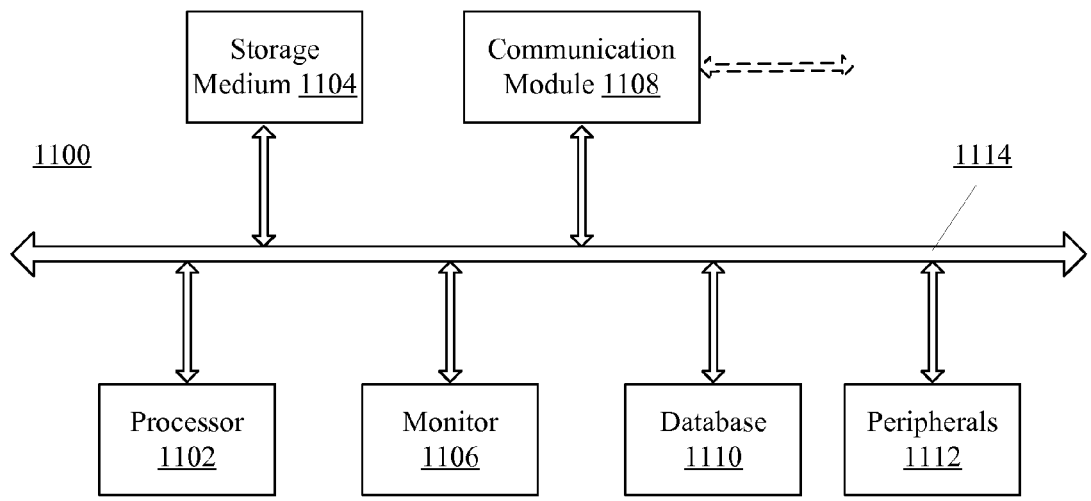
FIG. 11 depicts an exemplary computing system consistent with the disclosed embodiments.

FIG. 10 depicts an exemplary environment 1000 incorporating exemplary methods and systems in accordance with various disclosed embodiments. As shown in FIG. 10, the environment 1000 can include a server 1004, a terminal 1006, and a communication network 1002. The server 1004 and the terminal 1006 may be coupled through the communication network 1002 for information exchange, such as submitting/receiving request, sending/receiving task list, sending/receiving task data, etc. Although only one terminal 1006 and one server 1004 are shown in the environment 1000, any number of terminals 1006 or servers 1004 may be included, and other devices may also be included.

The communication network 1002 may include any appropriate type of communication network for providing network connections to the server 1004 and terminal 1006 or among multiple servers 1004 or terminals 1006. For example, the communication network 1002 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device. A client can refer to any suitable software programs for performing certain actions (e.g., game, browser, etc.). One or more clients can be implemented on a terminal.

A server, as used herein, may refer to one or more server computers configured to provide certain server functionalities, e.g., receiving requests, managing task data, sending task data. A server may also include one or more processors to execute computer programs in parallel.

Figure 6:
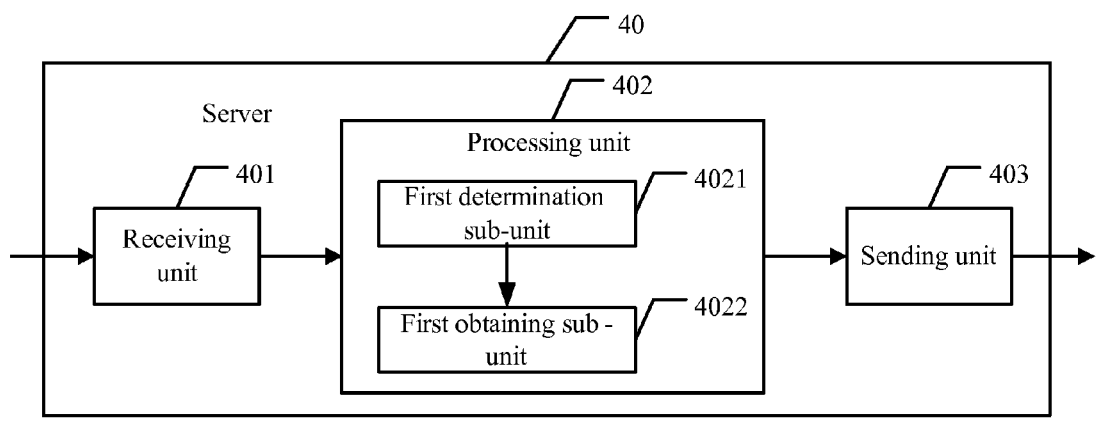
FIG. 6 depicts a structure diagram of another exemplary server in accordance with various disclosed embodiments.

The server 1004 and the terminal 1006 may be implemented on any appropriate computing platform. FIG. 6 shows a block diagram of an exemplary computing system 1100 (or computer system 1100) capable of implementing the server 1004 and/or the terminal 1006. As shown in FIG. 6, the exemplary computer system 1100 may include a processor 1102, a storage medium 1104, a monitor 1106, a communication module 1108, a database 1110, peripherals 1112, and one or more bus 1114 to couple the devices together. Certain devices may be omitted and other devices may be included.

The processor 1102 can include any appropriate processor or processors. Further, the processor 1102 can include multiple cores for multi-thread or parallel processing. The storage medium 1104 may include memory modules, e.g., Read-Only Memory (ROM), Random Access Memory (RAM), and flash memory modules, and mass storages, e.g., CD-ROM, U-disk, removable hard disk, etc. The storage medium 1104 may store computer programs for implementing various processes (e.g., task data, processing schemes for various types of task data, etc.), when executed by the processor 1102.

The monitor 1106 may include display devices for displaying contents in the computing system 1100, e.g., displaying interface for games or task data. The peripherals 1112 may include I/O devices such as keyboard and mouse.

Further, the communication module 1108 may include network devices for establishing connections through the communication network 1002. The database 1110 may include one or more databases for storing certain data and for performing certain operations on the stored data, e.g., storing task data, storing processing schemes for various types of task data, etc.

In operation, the terminal 1006 may cause the server 1004 to perform certain actions, e.g., receiving certain requests of processing task data, returning task data or task list to the client. The server 1004 may be configured to provide structures and functions for such actions and operations. The terminal 1006 may be configured to provide structures and functions correspondingly for suitable actions and operations.

In various embodiments, a client involved in the disclosed methods and systems can be implemented by the terminal 1006, while a server involved in the disclosed methods and systems can include the server 1004. In various embodiments, the methods and servers disclosed in accordance with various embodiments can be executed by a server computer.

Various embodiments provide methods for processing task data. Task data can be processed according to type of the task data, in order to meet diverse needs of users and improve efficiency of communication between users and clients. Efficiency of communication between users, clients and servers can also be improved. Various embodiments also provide corresponding servers and systems.

As used herein, wherever applicable, unless otherwise specified, 'task data' can refer to any suitable data related to a task or a plurality of tasks. The task data can include information used for identifying the task or the plurality of tasks, content of the task(s), output generated by the user during the completion of the task(s), results obtained after the task(s) are completed by the user, and/or any other suitable data.

Figure 1:
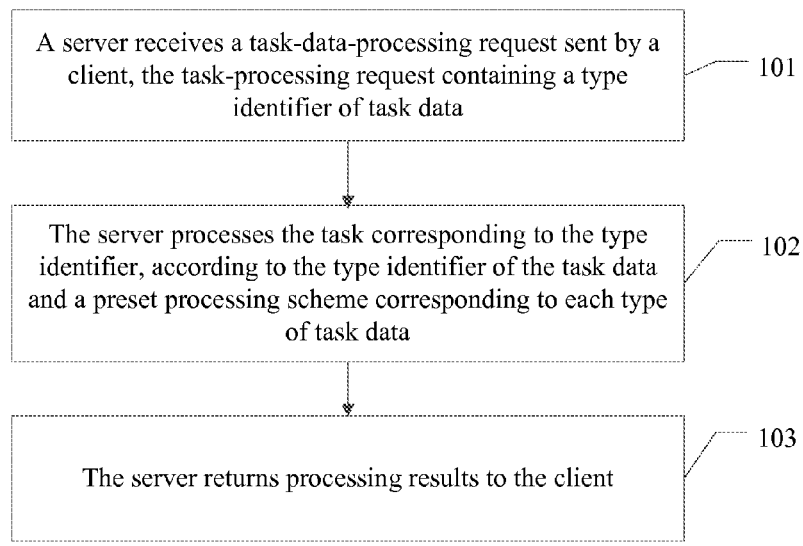
FIG. 1 depicts a flow diagram of an exemplary method for processing task data in accordance with various disclosed embodiments.

FIG. 1 depicts a flow diagram of an exemplary method for processing task data in accordance with various disclosed embodiments. The method can include the following exemplary steps.

In Step 101, a server receives a task-data-processing request sent by a client. A type identifier of task data can be carried in the task-data-processing request. In various embodiments, the sending of the task-data-processing request by the client can indicate that processing of the task data is requested.

The type identifier of the task data can include a daily-task-data identifier (or a daily task type identifier), a mainline-task-data identifier (or a mainline task type identifier), a random-task-data identifier (or a random task type identifier), and/or other types of task data identifiers. In various embodiments, the task-data-processing request can include, e.g., a daily-task-data-receiving request, a daily-task-data-submitting request, a mainline-task-data-cancellation request, and/or a random-task-data-refreshing request, and/or any other suitable requests.

In Step 102, according to the type identifier of the task data and a preset processing scheme corresponding to each type of task data, the server processes the task data corresponding to the type identifier of the task data. For the each type of task data, the server can have different processing scheme(s), respectively. Processing results can thus be generated.

In Step 103, the server returns the processing results to the client.

In various disclosed embodiments, a server can receive a task-data-processing request sent by a client. A type identifier of task data can be carried in the task-data-processing request. Processing of the task data is requested. According to the type identifier of the task data and a preset processing scheme corresponding to each type of task data, the server can process the task data corresponding to the type identifier of the task data. The server can then return processing results to the client. The disclosed methods for processing task data can meet the diverse needs of users, and improve efficiency of communication between users and clients.

Optionally, based on various disclosed embodiments (e.g., as shown in FIG. 1), in one embodiment, when the type identifier of the task data includes a daily-task-data identifier (i.e., indicating the task data are daily task data), the processing of the task (according to the type identifier of the task data and the preset processing scheme corresponding to each type of task data) can include the following steps.

For example, when it is confirmed that, information of a player currently using the client includes a first time login of a day (i.e., according to information of a player of the client, the player has logged in on the day for a first time), daily task data can be randomly obtained from a daily-task-data pool according to the daily-task-data identifier. The randomly-obtained daily task data can be data of one or more daily tasks randomly obtained from the daily-task-data pool. Correspondingly, the returning of the processing results to the client can include returning the daily task data to the client.

In this example, after logging in, the client can send a request (e.g., the task-data-processing request) to the server. Using a database, the server can obtain the information of the player currently using the client. Using the time of the logging in, it can be determined whether the information of the player currently-using the client includes a first time login of a day. For example, when the information includes the first time login of the day (i.e., it is the first time that the player has logged in on the day), according to the daily-task-data identifier, the daily task data can be randomly obtained from the daily-task-data pool. When the information does not include the first time login of the day (i.e., it is not the first time that the player has logged in on the day), it is not needed to obtain the daily task data randomly from the daily-task-data pool according to the daily-task-data identifier.

Optionally, based on various disclosed embodiments (e.g., as shown in FIG. 1), before returning the obtained daily task data to the client, the method can further include the following steps. For example, a daily task list containing identifiers of the obtained daily task data can be returned to the client. A daily-task-data-receiving request sent by the client can be received. An identifier of requested daily task data can be carried in the daily-task-data-receiving request. It can then be determined whether the identifier of the requested daily task data is in the daily task list.

The requested daily task data can include data of one or more tasks that the user requests via the client. One identifier of requested daily task data is depicted above for illustrative purposes. However, one or more identifiers of the requested daily task data can be carried in the daily-task-data-receiving request, without limitation.

In this case, the returning of the daily task data to the client can include the following steps. For example, after determining the identifier of the requested daily task data is in the daily task list, the daily task data corresponding to the identifier of the requested daily task data can be returned to the client.

In this case, when the server confirms that, when information of a player currently using the client includes a first time login of a day, daily task data can be randomly obtained from a daily-task-data pool according to the daily-task-data identifier. A daily task list containing identifiers of the obtained daily task data can be generated and sent to the client. After a daily-task-data-receiving request sent by the client is received, it can be determined whether an identifier of requested daily task data is in the daily task list. When the identifier of the requested daily task data is in the daily task list, the daily task data corresponding to the identifier of the requested daily task data can be returned to the client.

Optionally, based on various disclosed embodiments (e.g., as shown in FIG. 1), the method can further include receiving a daily-task-data-submitting request sent by the client. An identifier of submitted daily task data can be carried in the daily-task-data-submitting request. After determining that submitted daily task data corresponding to the identifier of the submitted daily task data is permitted for submission, and that the submitted daily task data are daily task data sent to the client on a non-current day, new daily task data can be selected from the daily task list and be sent to the client.

In various embodiments, the submitted daily task data can include data of one or more tasks that the user submits via the client, e.g., after the task(s) are completed. One identifier of submitted daily task data is depicted above for illustrative purposes. However, one or more identifiers of the submitted daily task data can be carried in the daily-task-data-submitting request, without limitation. As used herein, unless otherwise specified, wherever applicable, 'on a non-current day' can refer to 'on a day that is not the current day'. The new daily task data can refer to data of one or more tasks newly selected. In one embodiment, the new daily task data can include data of one new daily task.

In this example, after a daily-task-data-submitting request sent by the client is received, it can be determined whether the submitted daily task data corresponding to the identifier of the submitted daily task data are permitted for submission. When the submitted daily task data corresponding to the identifier of the submitted daily task data are permitted for submission, it needs to be determined whether the submitted daily task data are daily task data sent to the client on a non-current day. When the submitted daily task data are (or include) daily task data sent to the client on a non-current day, the server can select new daily task data for sending to the client, in order to prevent a player from playing a task that has been played a long time ago. Thus, new task(s) can be sent to the player, and novelty of the task(s) can be enhanced.

Optionally, based on various disclosed embodiments (e.g., as shown in FIG. 1), the receiving of the task-data-processing request sent by the client can include receiving a mainline-task-data-cancellation request sent by the client. A mainline-task-data identifier and an identifier of mainline task data for cancellation can be carried in the mainline-task-data-cancellation request.

Correspondingly, the processing of the task data can include the following steps. For example, the identifier of the mainline task data for cancellation can be searched for (i.e., looked up for identifying) in a mainline task list corresponding to the mainline-task-data identifier. When the mainline task list contains the identifier of the mainline task data for cancellation, the mainline task data corresponding to the identifier of the mainline task data for cancellation can be cancelled. Correspondingly, the returning of the processing results to the client can include returning a cancellation response message to the client.

In various embodiments, mainline task can refer to a task the user currently has. Mainline task can also refer to certain tasks defined as mainline tasks according to specific scheme of the game system, without limitation. The mainline task data for cancellation can include data of one or more mainline tasks that the user desires to cancel via the client. One identifier of submitted daily task data is depicted above for illustrative purposes. However, one or more identifiers of the mainline task data for cancellation can be carried in the mainline-task-data-cancellation request, without limitation.

In this example, the server can add a function of cancelling mainline tasks. When there are many mainline tasks, the player can cancel certain mainline tasks that he/she does not like to play, and does not need to complete the mainline tasks one by one.

Optionally, based on various disclosed embodiments (e.g., as shown in FIG. 1), the receiving of the task-data-processing request sent by the client can include receiving a random-task-data-refreshing request sent by the client. A random-task-data identifier can be carried in the random-task-data-refreshing request.

Correspondingly, the processing of the task data can include the following steps. For example, according to the random-task-data identifier, it can be determined whether the number of times of the client to request to refresh random tasks is within an allowed limit of the day. When the number of times of the client to request to refresh random tasks is within the allowed limit of the day, random task data and corresponding reward information of the random task data can be obtained. Correspondingly, the returning of the processing results to the client can include returning the random task data and the corresponding reward information.

In various embodiments, a random task can refer to a task randomly selected from a database (e.g., the daily-task-data pool, the daily task list, a task-node pool, or any other suitable collection of tasks). Reward information corresponding to a random task can refer to certain reward randomly obtained from a database (e.g., a reward pool). Random task data can refer to data of one or more random tasks. In one embodiment, random task data can include data of one random task, the data including an identifier of a random task and an identifier of reward information corresponding to the random task.

In this case, the server can refresh random tasks according to the request sent by the player via the client. The number of times of the refreshing can be limited by a refresh number. In various embodiments, within one day, the number of times of the refreshing may not be unlimited, so as to prevent the player from frequently refreshing to look for task data that have more reward. At the same time, the player's purpose of finding desired random tasks by refreshing for a limited number of times can be satisfied.

Figure 2:
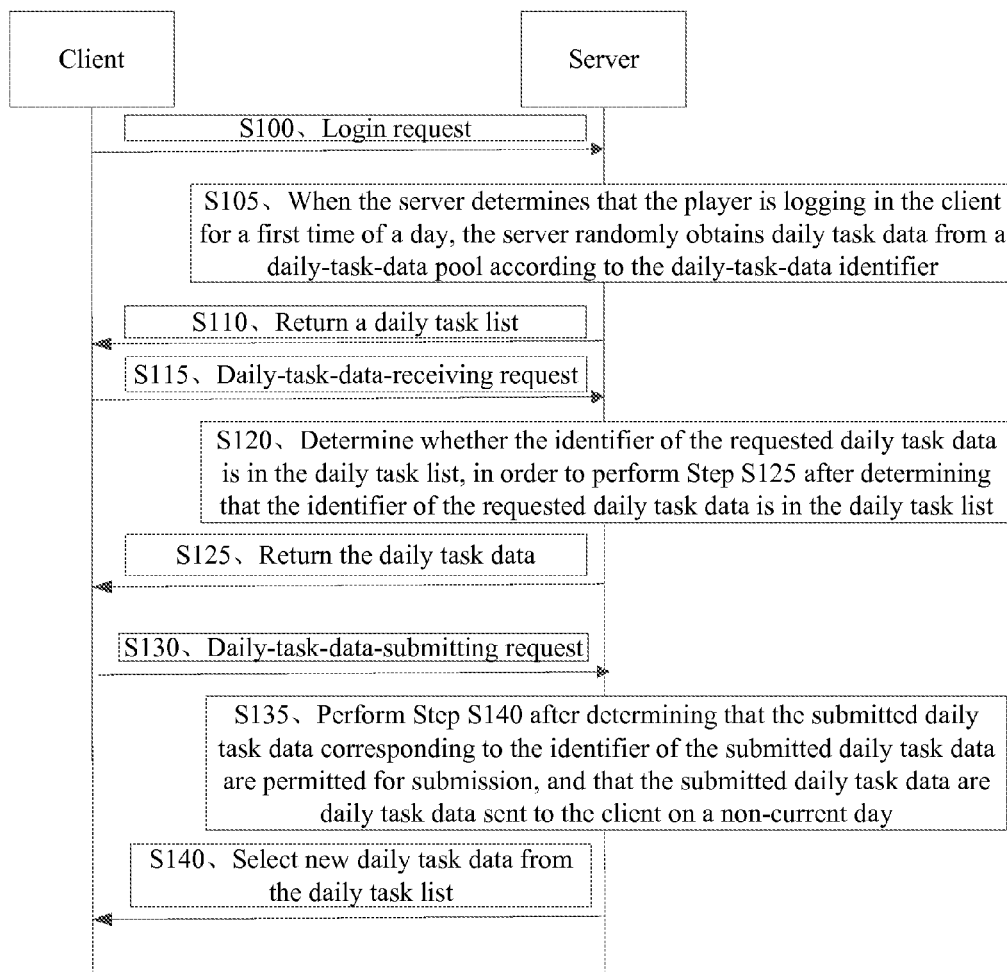
FIG. 2 depicts a scenario illustrating certain disclosed embodiments.

To ease understanding, the methods in accordance with various embodiments can be illustrated by the following exemplary scenarios. For example, FIG. 2 depicts a scenario illustrating certain disclosed embodiments. The exemplary scenario depicts processing daily task by a client and/or a server.

In Step S100, a client sends a server a login request message. In one embodiment, when a player logs in to the client, the client can send the login request message to the server.

In Step S105, when the server determines that, information (e.g., information from the login request message) of a player currently using the client includes a first time login of a day (i.e., the player is logging in via the client for a first time of a day), according to a daily-task-data identifier, the server can randomly obtain daily task data from a daily-task-data pool.

Using a database, the server can obtain the information of the player currently using the client and, by a time of the logging in, determine whether information of the player currently using the client includes a first time login of a day. When the information of the player currently using the client is determined to include the first time login of the day, the daily task data can be randomly obtained from the daily-task-data pool according to the daily-task-data identifier.

In Step S110, the server returns a daily task list to the client. Identifiers of the obtained daily task data can be carried in the daily task list.

In Step S115, the server receives a daily-task-data-receiving request sent by the client. An identifier of requested daily task data can be carried in the daily-task-data-receiving request.

In Step S120, the server determines whether the identifier of the requested daily task data is in the daily task list. After determining that the identifier of the requested daily task data is in the daily task list, the server can perform Step S 125. In Step S 125, daily task data corresponding to the identifier of the requested daily task data can be returned to the client.

In Step S130, the server receives a daily-task-data-submitting request sent by the client. An identifier of submitted daily task data can be carried in the daily-task-data-submitting request.

In Step S135, when the server determines that the submitted daily task data corresponding to the identifier of the submitted daily task data are permitted for submission, and that the submitted daily task data are daily task data sent to the client on a non-current day, Step S140 can be performed. In Step S140, the server selects new daily task data from the daily task list and sends the new daily task to the client.

Figure 3:
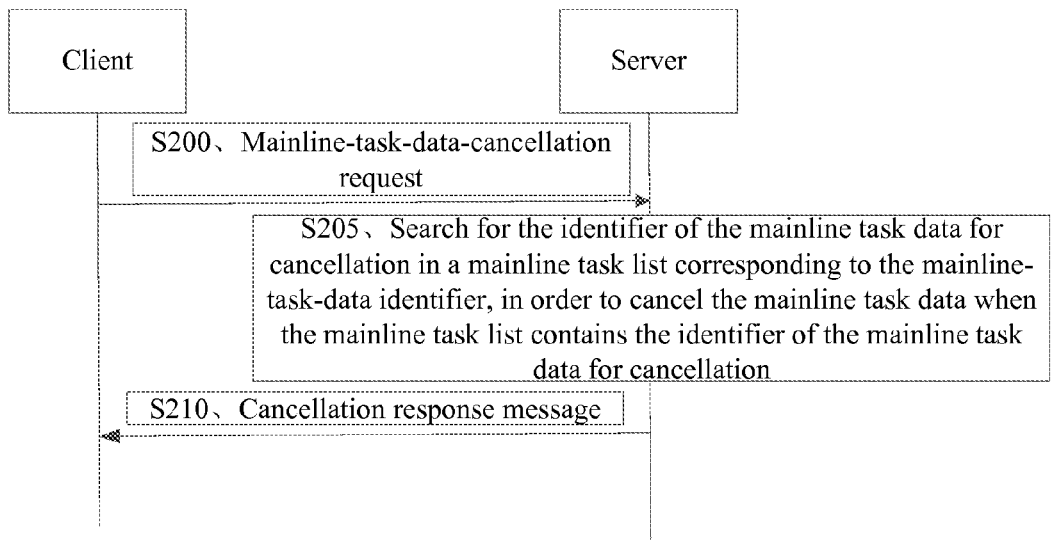
FIG. 3 depicts another scenario illustrating certain disclosed embodiments.

FIG. 3 depicts another scenario illustrating certain disclosed embodiments. The exemplary scenario depicts processing mainline task data by a client and/or a server.

In Step S200, a server receives a mainline-task-data-cancellation request sent by a client. A mainline-task-data identifier and an identifier of mainline task data for cancellation can be carried in the mainline-task-data-cancellation request.

In Step S205, the server searches for the identifier of the mainline task data for cancellation in a mainline task list corresponding to the mainline-task-data identifier. When the mainline task list contains the identifier of the mainline task data for cancellation, the mainline task data corresponding to the identifier of the mainline task data for cancellation can be cancelled.

In this example, the server can add a function of cancelling mainline tasks. When there are many mainline tasks, the player can cancel certain mainline tasks that the player does not like to play, and does not need to complete the mainline tasks one by one. In Step S210, the server returns a cancellation response message to the client.

Figure 4:
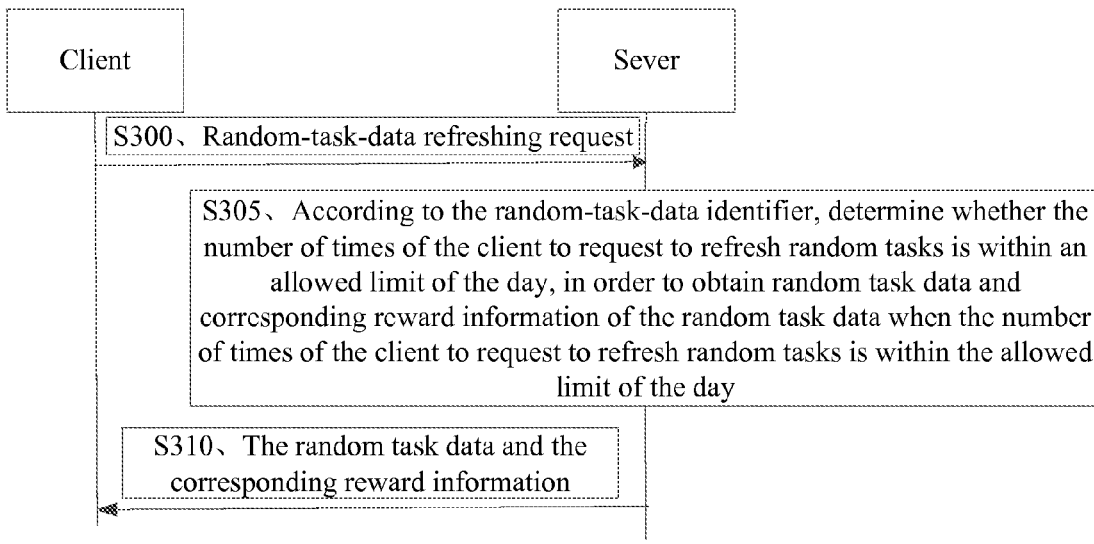
FIG. 4 depicts another scenario illustrating certain disclosed embodiments.

FIG. 4 depicts another scenario illustrating certain disclosed embodiments. The exemplary scenario depicts processing random task data by a client and/or a server.

In Step S300, the server receives a random-task-data-refreshing request sent by a client. A random-task-data identifier can be carried in the random-task-data-refreshing request.

In Step S305, according to the random-task-data identifier, the server determines whether the number of times of the client to request to refresh random tasks is within an allowed limit of the day. When the number of times of the client to request to refresh random tasks is within the allowed limit of the day, random task data and corresponding reward information of the random task can be obtained.

In this case, the server can refresh random tasks according to the request sent by the player via the client. The number of times of the refreshing can be limited by a refresh number. Within one day, the number of times of the refreshing may not be unlimited, so as to prevent the player from frequently refreshing in order to look for task data that have more reward. At the same time, the player's desire of finding desired random tasks by refreshing for a limited number of times can be satisfied. In Step S310, the obtained random task data and the corresponding reward information are returned to the client.

Figure 5:
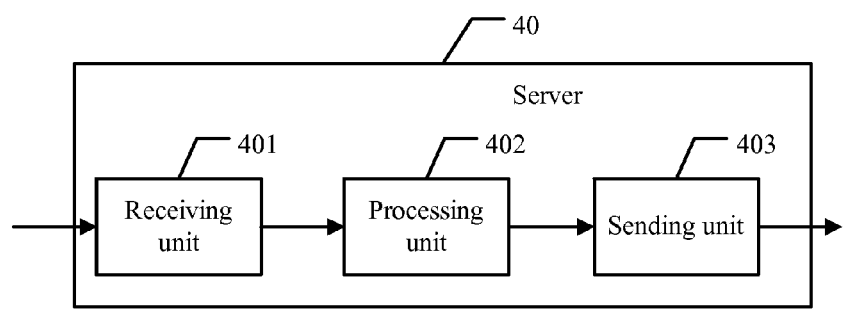
FIG. 5 depicts a structure diagram of an exemplary server in accordance with various disclosed embodiments.

FIG. 5 depicts a structure diagram of an exemplary server in accordance with various disclosed embodiments. The exemplary server can include a receiving unit 401, a processing unit 402, and/or a sending unit 403. Some units may be omitted and other units may be included.

The receiving unit 401 is configured to receive a task-data-processing request sent by a client. A type identifier of task data can be carried in the task-data-processing request. Processing of the task data is thus requested.

The processing unit 402 is configured to process the task data corresponding to the type identifier of the task, according to the type identifier of the task data received by the receiving unit 401 and a preset processing scheme corresponding to each type of task data. The sending unit 403 is configured to return processing results (from the processing unit 402) to the client.

In various disclosed embodiments, the receiving unit 401 can receive a task-data-processing request sent by a client. A type identifier of task data can be carried in the task-data-processing request. Processing of the task data is requested. The processing unit 402 can process the task data corresponding to the type identifier of the task data according to the type identifier of the task data received by the receiving unit 401 and a preset processing scheme corresponding to each type of task data. The sending unit 403 can return processing results (from the processing unit 402) to the client. The server in accordance with various embodiments can process task data according to type of task data. Thus, diverse needs of users can be met and efficiency of communication between users and clients can be improved.

Based on various embodiments (e.g., as shown in FIG. 5), FIG. 6 depicts a structure diagram of another exemplary server in accordance with various disclosed embodiments. In this example, when the type identifier of the task data is a daily-task-data identifier, the processing unit 402 can include a first determination sub-unit 4021 and/or a first obtaining sub-unit 4022. Some sub-units may be omitted and other units may be included.

The first determination sub-unit 4021 is configured to determine whether information of a player currently using the client includes a first time login of a day. The first obtaining sub-unit 4022 is configured to randomly obtain daily task data from a daily-task-data pool, according to the daily-task-data identifier, when the first determination sub-unit 4021 determines that the information of the player currently using the client includes the first time login of the day. The sending unit 403 is configured to return the obtained daily task data to the client.

Based on various embodiments (e.g., as shown in FIG. 6), in one embodiment, the sending unit 403 is further configured to return to the client a daily task list containing identifiers of the obtained daily task data. The receiving unit 401 is further configured to receive a daily-task-data-receiving request sent by the client. An identifier of requested daily task data can be carried in the daily-task-data-receiving request.

In this case, the first determination sub-unit 4021 is further configured to determine whether the identifier of the requested daily task data is in the daily task list. After the first determination sub-unit 4021 determines that the identifier of the requested daily task data is in the daily task list, the sending unit 403 is further configured to return to the client the requested daily task data corresponding to the identifier of the requested daily task data.

Based on various embodiments (e.g., as shown in FIG. 6), in one embodiment, the receiving unit 401 is configured to receive a daily-task-data-submitting request sent by the client. An identifier of submitted daily task data can be carried in the daily-task-data-submitting request.

In this case, the first determination sub-unit 4021 is configured to determine whether the submitted daily task data corresponding to the identifier of the submitted daily task data is permitted for submission, and to determine whether the submitted daily task data are (or include) the daily task data sent to the client on a non-current day.

After the first determination sub-unit 4021 determines that the submitted daily task data corresponding to the identifier of the submitted daily task data are permitted for submission, and that the submitted daily task data are (or include) the daily task data sent to the client on a non-current day, the sending unit 403 is configured to select new daily task data from the daily task list and send the new daily task data to the client.

Figure 7:
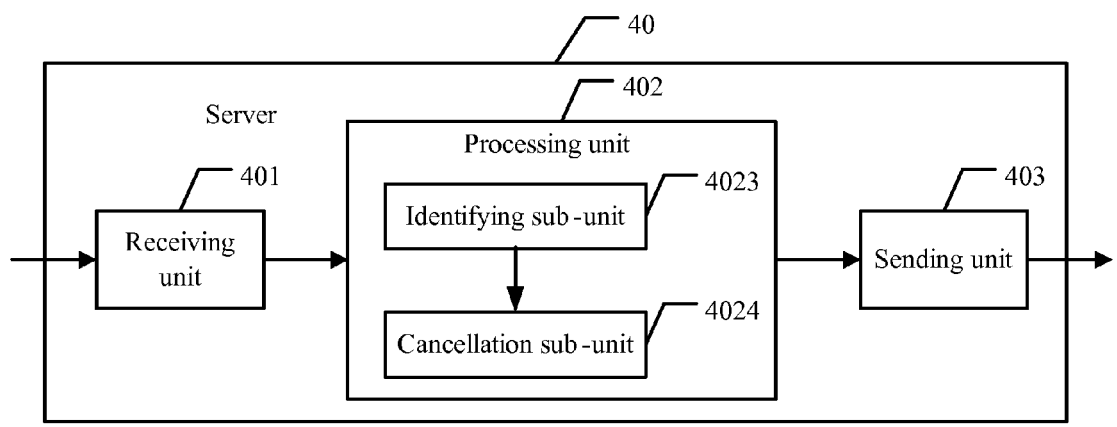
FIG. 7 depicts a structure diagram of another exemplary server in accordance with various disclosed embodiments.

Based on various embodiments (e.g., as shown in FIG. 5), FIG. 7 depicts a structure diagram of another exemplary server in accordance with various disclosed embodiments. In this example, the receiving unit 401 is configured to receive a mainline-task-data-cancellation request sent by a client. A mainline-task-data identifier of and an identifier of mainline task data for cancellation can be carried in the mainline-task-data-cancellation request.

The processing unit 402 can include an identifying sub-unit 4023 and/or a cancellation sub-unit 4024. Some sub-units may be omitted and other units may be included.

The identifying sub-unit 4023 is configured to search for the identifier of the mainline task for cancellation in a mainline task list corresponding to the mainline-task-data identifier. When the identifying sub-unit 4023 identifies that the identifier of the mainline task data for cancellation is contained in the mainline task list, the cancellation sub-unit 4024 is configured to cancel the mainline task data corresponding to the identifier of the mainline task data for cancellation. The sending unit 403 is configured to return a cancellation response message to the client.

Figure 8:
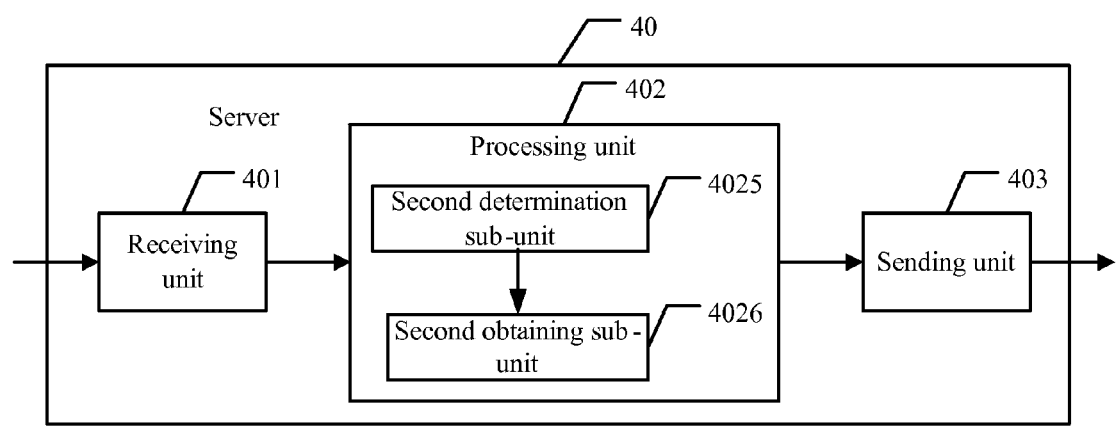
FIG. 8 depicts a structure diagram of another exemplary server in accordance with various disclosed embodiments.

Based on various embodiments (e.g., as shown in FIG. 5), FIG. 8 depicts a structure diagram of another exemplary server in accordance with various disclosed embodiments. In this example, the receiving unit 401 is configured to receive a random-task-data-refreshing request sent by a client. A random-task-data identifier can be carried in the random-task-data-refreshing request.

Accordingly, the processing unit 402 can include a second determination sub-unit 4025 and/or a second obtaining sub-unit 4026. Some sub-units may be omitted and other units may be included.

The second determination sub-unit 4025 is configured to determine whether the number of times of the client to request to refresh random tasks is within an allowed limit of the day, according to the random-task-data identifier. When the second determination sub-unit 4025 determines that the number of times of the client to request to refresh random tasks is within the allowed limit of the day, the second obtaining sub-unit 4026 is configured to obtain random task data and corresponding reward information of the random task. The sending unit 403 is configured to return to the client the obtained random task data and the corresponding reward information.

Figure 9:
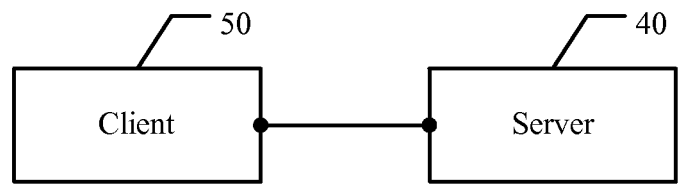
FIG. 9 depicts a structure diagram of an exemplary system in accordance with various disclosed embodiments.

FIG. 9 depicts a structure diagram of an exemplary system in accordance with various disclosed embodiments. The exemplary system can include a client 50 and a server 40.

The client 50 is configured to send a task-data-processing request to the server 40. A type identifier of task data can be carried in the task-data-processing request. Processing of the task data is requested. The client 50 is further configured to receive processing results returned by the server 40.

The server 40 is configured to receive the task-data-processing request sent by the client 50. The type identifier of the task data can be carried in the task-data-processing request. Further, the server 40 is configured to process the task corresponding to the type identifier of the task, according to the type identifier of the task data and a preset processing scheme corresponding to each type of task data. Processing results can thus be generated. Yet further, the server 40 is configured to return the processing results to the client 50.

In various embodiments, one or more or all of the steps in each of the exemplary methods herein can be accomplished using a program/software to instruct related hardware. Such program/software can be stored in a computer-readable storage medium including, ROM/RAM, magnetic disk, optical disk, etc. The computer-readable storage medium is non-transitory.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems can be used in a variety of Internet applications. By using the disclosed methods and systems, a task-data-processing request sent by a client can be received. The task-data-processing request can contain a type identifier of task data. The type identifier of the task data can include a daily-task-data identifier, a mainline-task-data identifier, a random-task-data identifier, or a combination thereof. The task data corresponding to the type identifier of the task data can be processed to generate processing results, according to the type identifier of the task data and a preset processing scheme corresponding to each type of the task data. The processing results can then be returned to the client. Thus, task data can be processed according to type of the task data, in order to meet diverse needs of users and improve efficiency of communication between users and clients. Efficiency of communication between users, clients and servers can also be improved.

When the type identifier of the task data includes a daily-task-data identifier, in one example, after a daily-task-data-submitting request sent by the client is received, it can be determined whether the submitted daily task data corresponding to the identifier of the submitted daily task data are permitted for submission. When the submitted daily task data corresponding to the identifier of the submitted daily task data are permitted for submission, and the submitted daily task data are daily task data sent to the client on a non-current day, the server can select new daily task data for sending to the client, in order to prevent a player from playing a task that has been played a long time ago. Thus, new task(s) can be sent to the player, and novelty of the task(s) can be enhanced.

When the type identifier of the task data includes a daily-task-data identifier, a mainline-task-data identifier, the system can add a function of cancelling mainline tasks. When there are many mainline tasks, the player can cancel certain mainline tasks that he/she does not like to play, and does not need to complete the mainline tasks one by one.

When the type identifier of the task data includes a random-task-data identifier, the system can refresh random tasks according to the request sent by the player via the client. The number of times of the refreshing can be limited by a refresh number. In various embodiments, within one day, the number of times of the refreshing may not be unlimited, so as to prevent the player from frequently refreshing to look for task data that have more reward. At the same time, the player's purpose of finding desired random tasks by refreshing for a limited number of times can be satisfied.

What is claimed is:

1. A method for processing task data implemented by a computer system, comprising:
   receiving a task-data-processing request sent by a client, wherein the task-data-processing request contains a type identifier of task data, and the type identifier of the task data includes a daily-task-data identifier, a mainline-task-data identifier, a random-task-data identifier, or a combination thereof;
   processing the task data corresponding to the type identifier of the task data to generate processing results, according to the type identifier of the task data and a preset processing scheme corresponding to each type of the task data; and
   returning the processing results to the client;
   wherein, when the type identifier of the task data includes the daily-task-data identifier, the processing of the task data includes: when information of a player currently using the client is determined to include a first time login of a day, randomly obtaining daily task data from a daily-task-data pool according to the daily-task-data identifier, to generate a daily task list containing identifiers of the daily task data; and
   wherein, accordingly, the returning of the processing results to the client includes: returning the daily task data to the client.

2. The method according to claim 1, wherein, before returning the processing results to the client, the method further includes:
   returning, to the client, the daily task list;
   receiving a daily-task-data-receiving request sent by the client, wherein the daily-task-data-receiving request contains an identifier of requested daily task data; and
   determining whether the identifier of the requested daily task data is in the daily task list; and
   wherein the returning of the daily task data to the client includes:
   after determining the identifier of the requested daily task data is in the daily task list, returning the requested daily task data to the client.

3. The method according to claim 1, further including:
   receiving a daily-task-data-submitting request sent by the client, wherein the daily-task-data-submitting request contains an identifier of submitted daily task data; and
   after determining that the submitted daily task data are permitted for submission, and that the submitted daily task data are daily task data sent to the client on a non-current day, selecting new daily task data from the daily task list for sending to the client.

4. The method according to claim 2, further including:
   receiving a daily-task-data-submitting request sent by the client, wherein the daily-task-data-submitting request contains an identifier of submitted daily task data; and
   after determining that the submitted daily task data are permitted for submission, and that the submitted daily task data are daily task data sent to the client on a non-current day, selecting new daily task data from the daily task list for sending to the client.

5. The method according to claim 1, wherein the receiving of the task-data-processing request sent by the client includes: receiving a mainline-task-data-cancellation request sent by the client, wherein the mainline-task-data-cancellation request contains the mainline-task-data identifier and an identifier of mainline task data for cancellation;
   wherein the processing of the task data includes: searching for the identifier of the mainline task data for cancellation in a mainline task list corresponding to the mainline-task-data identifier; and when the mainline task list contains the identifier of the mainline task data for cancellation, cancelling the mainline task; and
   wherein the returning of the processing results to the client includes: returning a cancellation response message to the client.

6. The method according to claim 1, wherein the receiving of the task-data-processing request sent by the client includes:
   receiving a random-task-data-refreshing request sent by the client, wherein the random-task-data-refreshing request contains the random-task-data identifier;
   wherein, accordingly, the processing of the task data includes:
   determining whether a number of times of the client to request to refresh random tasks is within an allowed limit of a current day, according to the random-task-data identifier; and
   when the number of times of the client to request to refresh random tasks is within the allowed limit of the current day, obtaining random task data and reward information corresponding to the random task data; and
   wherein the returning of the processing results to the client includes:
   returning the obtained random task data and the corresponding reward information to the client.

7. A server for processing task data, comprising:
a computer processor coupled to a memory;
a receiving unit configured to receive a task-data-processing request sent by a client, wherein the task-data-processing request contains a type identifier of task data, and the type identifier of the task data includes a daily-task-data identifier, a mainline-task-data identifier, a random-task-data identifier, or a combination thereof;
a processing unit configured to process the task data corresponding to the type identifier of the task data to generate processing results, according to the type identifier of the task data received by the receiving unit and a preset processing scheme corresponding to each type of task data; and
a sending unit configured to return the processing results from the processing unit to the client;
wherein, when the type identifier of the task data includes the daily-task-data identifier:
the processing unit includes a first determination sub-unit and a first obtaining sub-unit, wherein:
the first determination sub-unit is configured to determine whether information of a player currently using the client includes a first time login of a day; and
after it is determined that, the information of the player currently using the client includes the first time login of the day, the first obtaining sub-unit is configured to obtain daily task data randomly from a daily-task-data pool according to the daily-task-data identifier, to generate a daily task list containing identifiers of the daily task data; and
accordingly, the sending unit is configured to return the daily task data to the client.

8. The server according to claim 7, wherein:
the sending unit is further configured to return to the client the daily task list;
the receiving unit is further configured to receive a daily-task-data-receiving request sent by the client, wherein the daily-task-data-receiving request contains an identifier of requested daily task data; and
the first determination sub-unit is further configured to determine whether the identifier of the requested daily task data is in the daily task list; and
the sending unit is configured to return to the client the requested daily task data, after the first determination sub-unit determines that the identifier of the requested daily task data is in the daily task list.

9. The server according to claim 7, wherein:
the receiving unit is configured to receive a daily-task-data-submitting request sent by the client, wherein the daily-task-data-submitting request contains an identifier of submitted daily task data;
the first determination sub-unit is configured to determine whether the submitted daily task data are permitted for submission, and whether the submitted daily task data are daily task data sent to the client on a non-current day; and
the sending unit is configured to select new daily task data from the daily task list for sending to the client, after the first determination sub-unit determines that the submitted daily task data are permitted for submission, and that the submitted daily task data are the daily task data sent to the client on the non-current day.

10. The server according to claim 8, wherein:
the receiving unit is configured to receive a daily-task-data-submitting request sent by the client, wherein the daily-task-data-submitting request contains an identifier of submitted daily task data;
the first determination sub-unit is configured to determine whether the submitted daily task data are permitted for submission, and whether the submitted daily task data are daily task data sent to the client on a non-current day; and
the sending unit is configured to select new daily task data from the daily task list for sending to the client, after the first determination sub-unit determines that the submitted daily task data are permitted for submission, and that the submitted daily task data are the daily task data sent to the client on the non-current day.

11. The server according to claim 7, wherein:
the receiving unit is configured to receive a mainline-task-data-cancellation request sent by the client, wherein the mainline-task-data-cancellation request contains the mainline-task-data identifier and an identifier of mainline task data for cancellation;
the processing unit includes:
an identifying sub-unit configured to search for the identifier of the mainline task data for cancellation in a mainline task list corresponding to the mainline-task-data identifier; and
a cancellation sub-unit configured to cancel the mainline task data, when the identifying sub-unit identifies that the mainline task list contains the identifier of the mainline task data for cancellation; and
the sending unit is configured to return a cancellation response message to the client.

12. The server according to claim 7, wherein:
the receiving unit is configured to receive a random-task-data-refreshing request sent by the client, wherein the random-task-data identifier is carried in the random-task-data-refreshing request;
the processing unit accordingly includes:
a second determination sub-unit configured to determine whether a number of times of the client to request to refresh random tasks is within an allowed limit of a current day, according to the random-task-data identifier; and
a second obtaining sub-unit configured to obtain random task data and reward information corresponding to the random task data, when the second determination sub-unit determines that the number of times of the client to request to refresh random tasks is within the allowed limit of the current day; and
the sending unit is configured to return the obtained random task data and the corresponding reward information to the client.

13. A system for processing task data, including a server, the server comprising:
a computer processor coupled to a memory;
a receiving unit configured to receive a task-data-processing request sent by a client, wherein the task-data-processing request contains a type identifier of task data, and the type identifier of the task data includes a daily-task-data identifier, a mainline-task-data identifier, a random-task-data identifier, or a combination thereof;
a processing unit configured to process the task data corresponding to the type identifier of the task data to generate processing results, according to the type identifier of the task data received by the receiving unit and a preset processing scheme corresponding to each type of task data; and a sending unit configured to return the processing results from the processing unit to the client;

wherein, when the type identifier of the task data includes the daily-task-data identifier:

the processing unit includes a first determination sub-unit and a first obtaining sub-unit, wherein:

the first determination sub-unit is configured to determine whether information of a player currently using the client includes a first time login of a day; and after it is determined that, the information of the player currently using the client includes the first time login of the day, the first obtaining sub-unit is configured to obtain daily task data randomly from a daily-task-data pool according to the daily-task-data identifier, to generate a daily task list containing identifiers of the daily task data; and accordingly, the sending unit is configured to return the daily task data to the client.

* * * * *